US012809036B2

(12) United States Patent
Wyler

(10) Patent No.: US 12,809,036 B2
(45) Date of Patent: Nov. 24, 2026

(54) FOREST FIRE DETECTION SYSTEM AND METHOD

(71) Applicant: WILDSTAR, LLC, Saratoga, CA (US)

(72) Inventor: Gregory Thane Wyler, Stuart, FL (US)

(73) Assignee: WildStar, LLC, Arlington, TX (US)

( * ) Notice: Subject to any disclaimer, the term of this patent is extended or adjusted under 35 U.S.C. 154(b) by 204 days.

(21) Appl. No.: 18/772,609

(22) Filed: Jul. 15, 2024

(65) Prior Publication Data

US 2025/0076516 A1 Mar. 6, 2025

Related U.S. Application Data

(60) Provisional application No. 63/579,810, filed on Aug. 30, 2023.

(51) Int. Cl.
*G01S 19/17* (2010.01)
*H02S 20/30* (2014.01)
*H04W 84/18* (2009.01)

(52) U.S. Cl.
CPC ............... *G01S 19/17* (2013.01); *H02S 20/30* (2014.12); *H04W 84/18* (2013.01)

(58) Field of Classification Search
CPC ........ G01S 19/17; H02S 20/30; H04W 84/18; A62C 3/0271; G08B 17/005

(Continued)

(56) References Cited

U.S. PATENT DOCUMENTS 4,819,053 A * 4/1989 Halavais ............... G01S 5/0009 342/158
6,317,029 B1 * 11/2001 Fleeter ................. H04B 7/1851 455/12.1

(Continued)

FOREIGN PATENT DOCUMENTS

CA 3240265 A1 6/2023
EP 2542909 B1 * 2/2016 ............ H04W 24/00
WO WO-2021130531 A1 * 7/2021 ........... G08B 17/005

OTHER PUBLICATIONS

Liu et al., "Sensor-Based Satellite IoT for Early Wildfire Detection" Arxiv.Org., 2021 IEE Globecom Workshops, Dec. 7, 2021, pp. 1-6.

(Continued)

*Primary Examiner* — Nuzhat Pervin
(74) *Attorney, Agent, or Firm* — Erin P. Madill

(57) ABSTRACT

The disclosed technology is generally directed to a system for detecting forest fires. The system may include a plurality of sensor devices in communication with each other, and a plurality of satellites in communication with at least one of the plurality of sensor devices via non-line-of-sight (NLOS) communication. Each of the sensor devices may include sensor(s) configured to measure a physical parameter; a processor that detects a condition indicative of a forest fire based on the measured physical parameter and generate a signal when the condition indicative of the forest fire is detected; and a communication interface and an antenna that communicates signals modulated with data indicating that the condition indicative of the forest fire has been detected. Each of the satellites may include a phased array antenna system that is configured to receive the signals that indicate that the condition indicative of the forest fire has been detected.

24 Claims, 5 Drawing Sheets

(58) Field of Classification Search
USPC .................................................... 342/357.55
See application file for complete search history.

(56) References Cited

U.S. PATENT DOCUMENTS

| | | | | |
|---|---|---|---|---|
| 8,400,292 | B2 * | 3/2013 | Kummetz | G01S 5/0289 340/517 |
| 8,457,798 | B2 * | 6/2013 | Hackett | G05B 19/4185 700/282 |
| 9,911,297 | B2 * | 3/2018 | Lundy | G08C 17/02 |
| 11,169,028 | B2 * | 11/2021 | Frank | B64U 20/87 |
| 11,521,479 | B2 * | 12/2022 | Shah | G08B 17/005 |
| 11,719,828 | B2 * | 8/2023 | Tuck | G01S 19/215 342/357.32 |
| 12,263,366 | B2 * | 4/2025 | Cosentino | A62C 3/0271 |
| 2006/0176169 | A1 * | 8/2006 | Doolin | G08B 31/00 340/521 |
| 2011/0122245 | A1 * | 5/2011 | Sinha | H01Q 19/10 340/532 |
| 2011/0210843 | A1 * | 9/2011 | Kummetz | H04W 24/00 340/517 |
| 2013/0321149 | A1 * | 12/2013 | Ben-Shmuel | G08B 17/005 340/539.26 |
| 2015/0256401 | A1 * | 9/2015 | Zinger | H04W 40/246 370/401 |
| 2020/0065433 | A1 * | 2/2020 | Duff | G01S 5/02 |
| 2020/0188708 | A1 * | 6/2020 | Myslinski | A61B 5/0024 |
| 2021/0225145 | A1 * | 7/2021 | Badri | G08B 17/005 |
| 2021/0349066 | A1 * | 11/2021 | Chilla | G08B 21/14 |
| 2021/0405213 | A1 * | 12/2021 | Tuck | G01S 19/215 |
| 2023/0304982 | A1 * | 9/2023 | Eichenlaub | G01N 33/0062 |
| 2024/0346899 | A1 * | 10/2024 | Brinkschulte | G08B 17/005 |
| 2025/0046167 | A1 * | 2/2025 | Brinkschulte | A62C 3/0271 |
| 2025/0213899 | A1 * | 7/2025 | Brinkschulte | A62C 3/0228 |
| 2025/0222291 | A1 * | 7/2025 | Brinkschulte | A62C 3/0228 |

OTHER PUBLICATIONS

Choi et al., "Challenges for Efficient and Seamless Space-Terrestrial Heterogeneous Networks," IEEE Communications Maazine, vol. 53, No. 5, May 1, 2015, pp. 156-162.

International Application No. PCT/US2024/038094, International Search Report and Written Opinion mailed Oct. 14, 2024, 19 pages.

Pingyue et al., "Low Earth Orbit Satellite Security and Reliability: Issues, Solutions, and the Road Ahead," Arxiv.Org, Cornell University Library, May 15, 2023, pp. 1-46.

* cited by examiner

FOREST FIRE DETECTION SYSTEM AND METHOD

CROSS REFERENCE TO RELATED APPLICATIONS

This application claims the benefit of U.S. Provisional Application Ser. No. 63/579,810, filed on Aug. 30, 2023, the disclosure of which is incorporated herein by reference.

TECHNICAL FIELD

This disclosure is directed to forest fire detection systems and methods, and more particularly, to forest fire detection systems for detecting forest fires that utilize one or more satellites that is (or are) in communication with one or more terrestrial sensor devices via non-line-of-sight communications.

BACKGROUND

Forest fire detection encompasses a multifaceted approach that employs satellite technology and sensor systems to enhance the ability to detect, monitor, and respond to potential fire outbreaks in natural landscapes. Satellites equipped with advanced sensors, such as thermal infrared and multispectral detectors, enable the remote observation of vast forested areas from space. These sensors can detect and quantify thermal anomalies, characterized by elevated temperatures indicative of fire events. By continuously monitoring broad geographical extents, satellites facilitate the prompt identification of nascent fire outbreaks, even in remote or inaccessible locations, expediting timely response efforts.

Complementing the satellite-based approach, ground-level sensor networks constitute an indispensable component of modern forest fire detection systems. These networks comprise an array of specialized sensors designed to detect various parameters associated with fire, including smoke particles, elevated temperatures, increased levels of carbon dioxide (CO2), and fluctuations in humidity. Deployed strategically across vulnerable regions, these sensors contribute to a localized understanding of environmental conditions, enhancing the precision of fire detection and enabling early intervention.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, an exemplary embodiment of the present disclosure may provide a system may include a plurality of sensor devices in communication with each other, and a plurality of satellites in communication with at least one of the plurality of sensor devices via non-line-of-sight (NLOS) communication. Implementations of the described techniques may include hardware, a method or process, or a non-transitory, a computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features.

The sensor devices may be deployed at different locations in a geographic area that includes, for example, a forest. In one embodiment, for example, the plurality of sensor devices are positioned at the different locations in the geographic area to provide sensor coverage over substantially all of the forest.

Each of the sensor devices may include at least one sensor configured to measure a physical parameter; a processor configured to detect a condition indicative of a forest fire based on the measured physical parameter and generate a signal when the condition indicative of the forest fire is detected; and a communication interface and an antenna configured to communicate the signal. The signal is modulated with data indicating that the condition indicative of the forest fire has been detected. Each of the plurality of sensor devices is configured to establish communication with at least one of the plurality of satellites to transmit the signal.

In an exemplary embodiment of the present disclosure, each of the plurality of sensor devices includes: a set of sensors including the at least one sensor and in some implementations a plurality of sensors. Depending on the implementation, each of the plurality of sensor devices includes may include one or more of: a carbon dioxide ($CO_2$) sensor, a thermal imaging sensor, a smoke detector, a gas sensor, a flame detector, an ultraviolet sensor, an acoustic sensor, a thermocouple, a fiber optic temperature sensor, a flame ionization detector, etc. Depending on the implementation, the physical parameter(s) measured by each sensor of the set of sensors can include one or more of: a carbon dioxide ($CO_2$) level, another gas level associated with combustions, a smoke particle level, a temperature level, an emission level, and a radiation level fire.

In an exemplary embodiment of the present disclosure, each of the plurality of sensor devices includes: one or more antennas configured to facilitate communication with other ones of plurality of sensor devices and the plurality of satellites; at least one battery; and solar cells configured to receive light and charge the at least one battery. For example, the solar cells may include: a first set of solar cells disposed on a first side of the sensor device; and a second set of solar cells disposed on a second side of the sensor device, where at least one of the first set of solar cells and the second set of solar cells is configured to charge the at least one battery based on an orientation of the sensor device.

In addition, each of the satellites may include a phased array antenna system that is configured to receive, from at least one of the sensor devices, the signal modulated with data indicating that the condition indicative of the forest fire has been detected. In an exemplary embodiment of the present disclosure, each antenna of each of the plurality of sensor devices is configured to communicate directly with at least one phased array antenna system of at least one of the plurality of satellites.

To help achieve non-line-of-sight (NLOS) communication capability on the downlink, each phased array antenna system may be configured to generate a satellite beam of radio waves at, for example, a frequency less than or equal to 300 Mega Hertz (MHZ), and at a wavelength greater than or equal to 1 meter such that the satellite beam of radio waves has a power flux density of at least −100 Decibels Milliwatt per Square Meter ($dBm/m^2$).

In an exemplary embodiment of the present disclosure, the plurality of sensor devices are configured to communicate with each other and exchange data to configure a mesh network such that the plurality of sensor devices are configured to communicate information with each other. For example, in an exemplary embodiment of the system, the plurality of sensor devices may include: a first sensor device and a second sensor device that is in communication with the first sensor device and aware of its status. The first sensor device may be configured to generate a first signal when a condition indicative of the forest fire is detected and communicate the first signal so that it may be received by at least one of the plurality of satellites. However, when the first signal communicated by first forest sensor is not acknowledged by at least one of the plurality of satellites, the second sensor device may be configured to retransmit a second signal that is modulated with data indicating that the condition indicative of the forest fire has been detected by the first sensor device.

Each of the plurality of satellites may be configured to determine, based on the signal received from at least one of the plurality of sensor devices, at least one of: a location of the forest fire, an area in which the forest fire is detected, a warning level of the forest fire, a direction in which the forest fire is moving, and a speed at which the forest fire is spreading.

For example, based on locations of the sensor devices which detected the condition indicative of the forest fire, each of the plurality of satellites may be configured to determine at least one of: the location of the forest fire, and the area in which the forest fire is detected.

The warning level of the forest fire may be detected based on a number of the sensor devices that detected the condition indicative of the forest fire. The warning level of the forest fire may be proportional to the number of the sensor devices that detected the condition indicative of the forest fire such that the warning level is greater when a larger number of sensor devices have detected the condition indicative of the forest fire and is lower when a smaller number of sensor devices have detected the condition indicative of the forest fire.

In some implementations, one or more of a direction in which the forest fire is moving and a speed at which the forest fire is spreading may be determined based on one or more of: locations of the sensor devices that detected the condition indicative of the forest fire, and timestamps at which the signal is received from the sensor devices that detected the condition indicative of the forest fire.

In another aspect, an exemplary embodiment of the present disclosure may provide a sensor device for detecting forest fires. The sensor device may include at least one sensor configured to measure a physical parameter; a processor configured to: detect a condition indicative of a forest fire based on the measured physical parameter, and generate a signal for communication to a satellite when the condition indicative of the forest fire is detected; and a first communication interface and at least one antenna configured to directly communicate with the satellite via non-line-of-sight communication, and operable to transmit the signal to the satellite, wherein the signal is modulated with data indicating that the condition indicative of the forest fire has been detected.

In an exemplary embodiment of the present disclosure, the signal transmitted via the first communication interface and the at least one antenna is further modulated with data indicating the location of the sensor device.

In an exemplary embodiment of the present disclosure, the sensor device may further include: one or more antennas configured to facilitate communication with other ones of plurality of sensor devices and the plurality of satellites; at least one battery; and solar cells configured to receive light and charge the at least one battery. The one or more antennas are configured to communicate directly with at least one phased array antenna system of the satellite.

In one implementation, the solar cells include: a first set of solar cells disposed on a first side of the sensor device; and a second set of solar cells disposed on a second side of the sensor device, wherein at least one of the first set of solar cells and the second set of solar cells is configured to charge the at least one battery based on an orientation of the sensor device.

In an exemplary embodiment of the present disclosure, the sensor device may include a set of sensors that include the at least one sensor. Each sensor of the set of sensors may be at least one of: a carbon dioxide ($CO_2$) sensor, a thermal imaging sensor, a smoke detector, a gas sensor, a flame detector, an ultraviolet sensor, an acoustic sensor, a thermocouple, a fiber optic temperature sensor, and a flame ionization detector. The physical parameter measured by each sensor of the set of sensors is at least one of: a carbon dioxide ($CO_2$) level, another gas level associated with combustions, a smoke particle level, a temperature level, an emission level, and a radiation level fire.

In an exemplary embodiment of the present disclosure, the sensor device may further include a second communication interface that is configured to communicate with a plurality of other sensor devices (e.g., that are deployed at different locations in a geographic area that includes a forest). The sensor device and the plurality of other sensor devices are configured to communicate with each other and exchange data as part of a mesh network of sensor devices that are configured to communicate information with each other. The sensor device is configured to retransmit signals communicated by the other plurality of sensor devices when those signals are not acknowledged by at least one of the plurality of satellites.

In another aspect, and exemplary embodiment of the present disclosure may provide a satellite that is configured to communicate with at least one of a plurality of terrestrial sensor devices via non-line-of-sight communication. The satellite may include a phased array antenna system that is coupled to a communication interface. The phased array antenna system is configured to communicate directly with the at least one of the plurality of terrestrial sensor devices. For instance, in an exemplary embodiment of the present disclosure, the phased array antenna system may be configured to generate a satellite beam of radio waves at a frequency less than or equal to 300 Mega Hertz (MHz) at a wavelength greater than or equal to 1 meter. The satellite beam of radio waves may have a power flux density of at least −100 Decibels Milliwatt per Square Meter ($dBm/m^2$).

The phased array antenna system may be configured to receive a signal transmitted directly from at least one terrestrial sensor device. The signal may be modulated with data indicating that a condition indicative of the forest fire has been detected.

In an exemplary embodiment of the present disclosure, the satellite may further include a processor. The processor is configured to determine, based on the signal received from the at least one of the plurality of terrestrial sensor devices, at least one of: a location of the forest fire, an area in which the forest fire is detected, a warning level of the forest fire, a direction in which the forest fire is moving, and a speed at which the forest fire is spreading. The location of the forest fire may be determined based on locations of the terrestrial sensor devices which detected the condition indicative of the forest fire. The area in which the forest fire is detected may be determined based on locations of the terrestrial sensor devices which detected the condition indicative of the forest fire. The warning level of the forest fire may be determined based on a number of the terrestrial sensor devices that detected the condition indicative of the forest fire. The warning level of the forest fire is proportional to the number of the terrestrial sensor devices that detected the condition indicative of the forest fire such that the warning level is greater when a larger number of terrestrial sensor devices have detected the condition indicative of the forest fire and is lower when a smaller number of terrestrial sensor devices have detected the condition indicative of the forest fire.

At least one of a direction in which the forest fire is moving and a speed at which the forest fire is spreading may be determined based on: locations of the terrestrial sensor devices that detected the condition indicative of the forest fire; and timestamps at which the signal is received from the terrestrial sensor devices that detected the condition indicative of the forest fire.

In another aspect, an exemplary embodiment of the present disclosure may provide a method for detecting forest fires. In accordance with the method a satellite may receive signals from one or more terrestrial sensor devices, and process the received signals to determine at least one of: a location of the forest fire, an area in which the forest fire is detected, a warning level of the forest fire, a direction in which the forest fire is moving, and a speed at which the forest fire is spreading.

Further aspects, features, applications and advantages of the disclosed technology, as well as the structure and operation of various examples, are described in detail below with reference to the accompanying drawings. It is noted that the disclosed technology is not limited to the specific examples described herein. Such examples are presented herein for illustrative purposes only. Additional examples will be apparent to persons skilled in the relevant art(s) based on the teachings contained herein.

BRIEF DESCRIPTION OF THE SEVERAL VIEWS OF THE DRAWINGS

For a better understanding of the present disclosure, non-limiting and non-exhaustive examples of the present disclosure are described with reference to the following drawings, in which.

In the drawings, similar reference numerals refer to similar parts throughout the drawings unless otherwise specified. These drawings are not necessarily drawn to scale.

DETAILED DESCRIPTION

Figure 1:
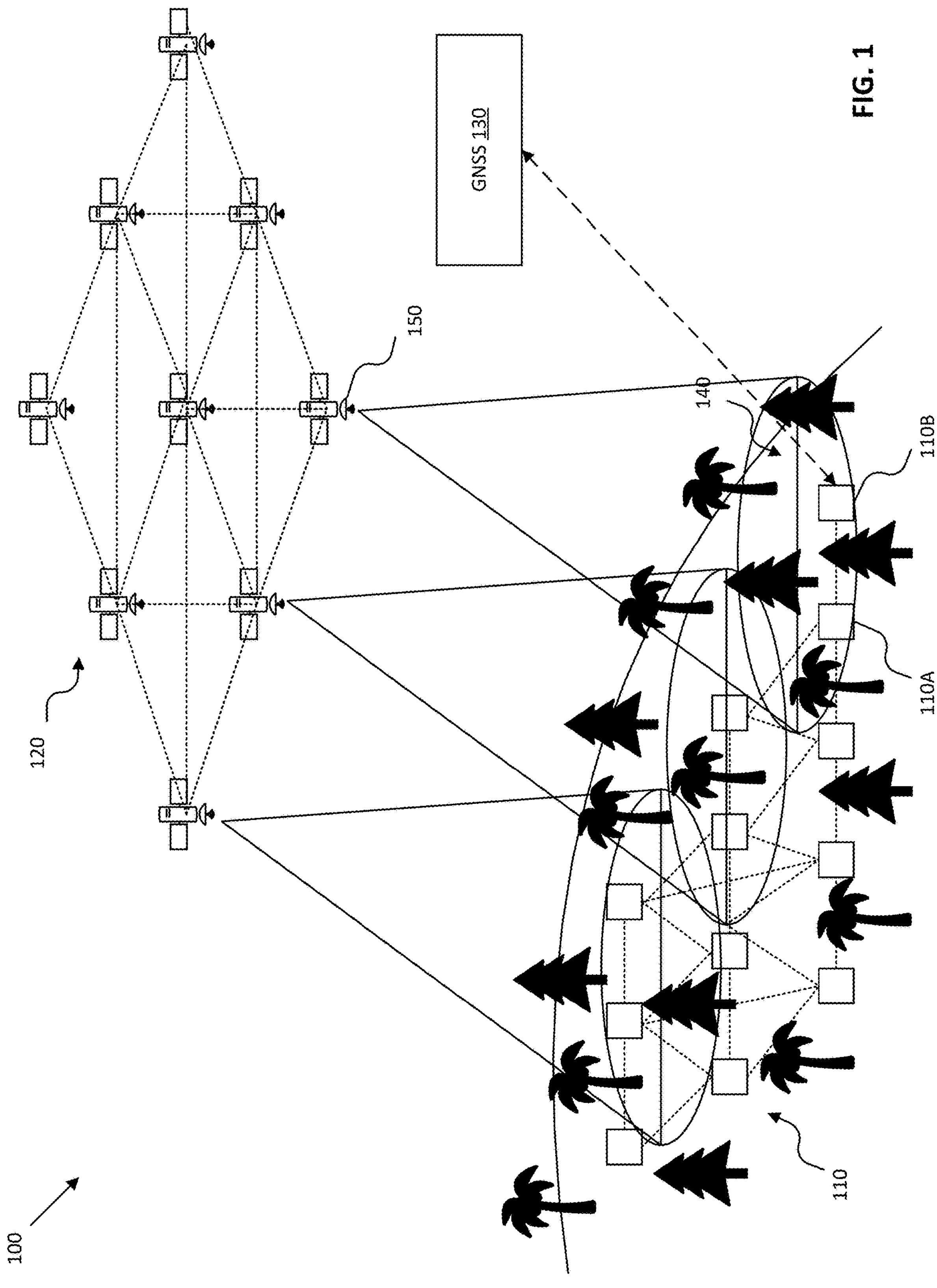
FIG. 1 is a simplified diagram illustrating a non-terrestrial network communication system in which aspects of the technology may be employed.

The specification and accompanying drawings disclose one or more exemplary embodiments that incorporate the features of the present disclosure. The scope of the present disclosure is not limited to the disclosed embodiments. The disclosed embodiments merely exemplify the present disclosure, and modified versions of the disclosed embodiments are also encompassed by the present disclosure. Embodiments of the present disclosure are defined by the claims appended hereto.

It is noted that any section/subsection headings provided herein are not intended to be limiting. Any embodiments described throughout this specification, and disclosed in any section/subsection may be combined with any other embodiments described in the same section/subsection and/or a different section/subsection in any manner.

Implementations of the techniques described herein may include hardware, a method or process, or a non-transitory computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features.

The integration of satellite and sensor technologies hinges upon robust data communication infrastructure. In one approach, remote sensor nodes are interconnected through gateways that relay data to centralized command centers via satellite links or terrestrial networks. This seamless connectivity empowers real-time data analysis, facilitating the generation of comprehensive situational awareness reports and informed decision-making.

However, one of the challenges in implementing systems with approaches like those described above relates to maintaining connectivity between terrestrial sensors, satellites of satellite systems and other networks. Implementation of large-scale forest fire detection is impeded by the inadequate establishment of seamless communication networks. While sensors are identified as adept tools for detecting pivotal indicators of fire, such as smoke density, $CO^2$ levels, humidity fluctuations, and heightened temperatures, the effectiveness of these sensors is hampered when the sensors are unable to send their information to other systems, like satellites or computer networks, for alerts and warnings.

The aforementioned challenge of connectivity is aggravated by the intricacies of deploying sensors within densely forested regions. While the sensors boast detection ranges spanning from a few meters to several tens of meters, their operational efficacy remains highly dependent on the presence of gateways that facilitate connections to satellite or IP networks. These gateways, while essential, introduce a layer of complexity that is difficult to overcome, limiting the seamless flow of data from the sensors to the broader communication networks that are imperative for timely fire detection and alerts.

Moreover, the role of satellites in forest fire detection also includes limitations, primarily concerning obstructions within the forest environment. The innate challenge of signal propagation in dense forest cover necessitates the installation of satellite terminals approximately every 100 meters to ensure uninterrupted communication which, may be theoretically sound, but is difficult to be practically implemented. The need for consistent terminal maintenance to counteract signal disruptions from foliage interference gives rise to substantial management costs, thereby rendering large-scale deployments economically infeasible.

The objective of the disclosed forest fire detection systems is to effectively address the connectivity challenge in large-scale forest fire detection to enable seamless communication between sensors and satellite networks and to enable cost-effective, expansive, and robust forest fire detection systems. The proposed system includes deployment sensors throughout some or all of an entire forest using a unique approach. The sensors would be designed to be lightweight and compact, making them easy to transport and deploy, for example, the sensors may be dropped from an aircraft, allowing the sensors to gently float down to the forest floor without causing any harm to the environment below.

In accordance with the disclosed embodiments, sensor devices possess the capability of communicating directly with satellites via NLOS communications, even when obstructed by the forest canopy which causes foliage interference. The sensor devices may send their data to satellites for analysis and alerts, regardless of whether the sensors have a clear view of the sky. To ensure sustained power supply, the sensors are equipped with one or more solar cell arrays, and in some implementations, solar cell arrays on all surfaces (e.g., on both sides of the sensor device). The aforementioned design enables the sensors to recharge over time, regardless of their orientation with respect to incoming solar radiation when they land.

The technology envisions the sensors forming a network that communicates not only with satellites but also with each other. On the ground, these sensor devices can establish a mesh network of sensor devices that can connect with each other to share and exchange various types of information. This dynamic mesh network may be established as needed, allowing the sensor devices to adapt to changing conditions and efficiently relay important data.

In one possible implementation, the sensors could be fabricated using thin film electronics, making them as compact and lightweight as possible. The sensors can also include integrated components alike antennas, solar panels, and batteries that may be implemented using thin film technologies. This integrated design streamlines their functionality and ensures they can operate effectively in their forest environment.

By seamlessly combining the capabilities of a satellite communication system that operates even in non-line-of-sight (NLOS) mode and a cost-effective sensor deployment strategy, this present disclosure provides the potential for comprehensive forest fire coverage on a large scale. The present disclosure presents a technical solution to overcome the connectivity challenge and revolutionizes the effectiveness of forest fire detection systems.

Having given this description of forest fire detection systems that can be applied within the context of the present disclosure, technologies will now be described for detecting forest fires by utilizing satellite constellations and sensor networks will now be described with reference to FIGS. 1-4.

FIG. 1 is a simplified diagram illustrating a non-terrestrial network communication system 100 in which aspects of the technology may be employed. The system 100 includes "forest" sensor devices 110 that are in communication with each other, and a constellation of satellites 120 that are in communication with one or more of the sensor devices 110. In one embodiment, the satellites 120 may make up a 5G Non-Terrestrial Network, such as a Low Earth Orbit (LEO) constellation.

Notably, the sensor devices 110 and the satellites 120 that make up the constellation are designed so that they are capable of non-line-of-sight (NLOS) communications with one another, as will be explained in greater detail below. When communication devices, such as the sensor devices 110 and based stations implemented at satellites 120, are capable of NLOS communication, the device can establish communication links even when there are obstacles or obstructions between the transmitter and the receiver. In traditional line-of-sight communication, a clear and unobstructed path is required between the transmitting and receiving antennas for reliable signal transmission. However, NLOS communication allows signals to propagate and reach the receiver even if there are buildings, trees, terrain features, or other obstacles in the way. NLOS communication is particularly important in urban environments, dense foliage, indoor settings, and situations where direct line-of-sight paths are blocked.

The system 100 further includes a global navigation satellite system (GNSS) 130 that is in communication with one or more of the sensor devices 110. In one embodiment, the GNSS are satellite-based navigation systems that provide the sensor devices 110 with positioning, navigation, and timing information anywhere on Earth. Examples of GNSS include, but are not limited to, the Global Positioning System (GPS), GLONASS, Galileo, BeiDou, and NavIC. The sensor devices 110 are configured to receive signals from multiple satellites of the GNSS 130, determine a time required for the signals to reach the sensor devices 110, and determine a location of the sensor devices 110 on the earth's surface based on the determined time.

The sensor devices 110 may be deployed at different locations in a geographic area 140 that includes, for example, a forest or other obstacles that prevent a clear line of sight to space. In one embodiment, for example, the sensor devices 110 are positioned at the different locations in certain geographic area to provide sensor coverage over part of or substantially all of the forest.

Sensor Devices

Figure 2A:
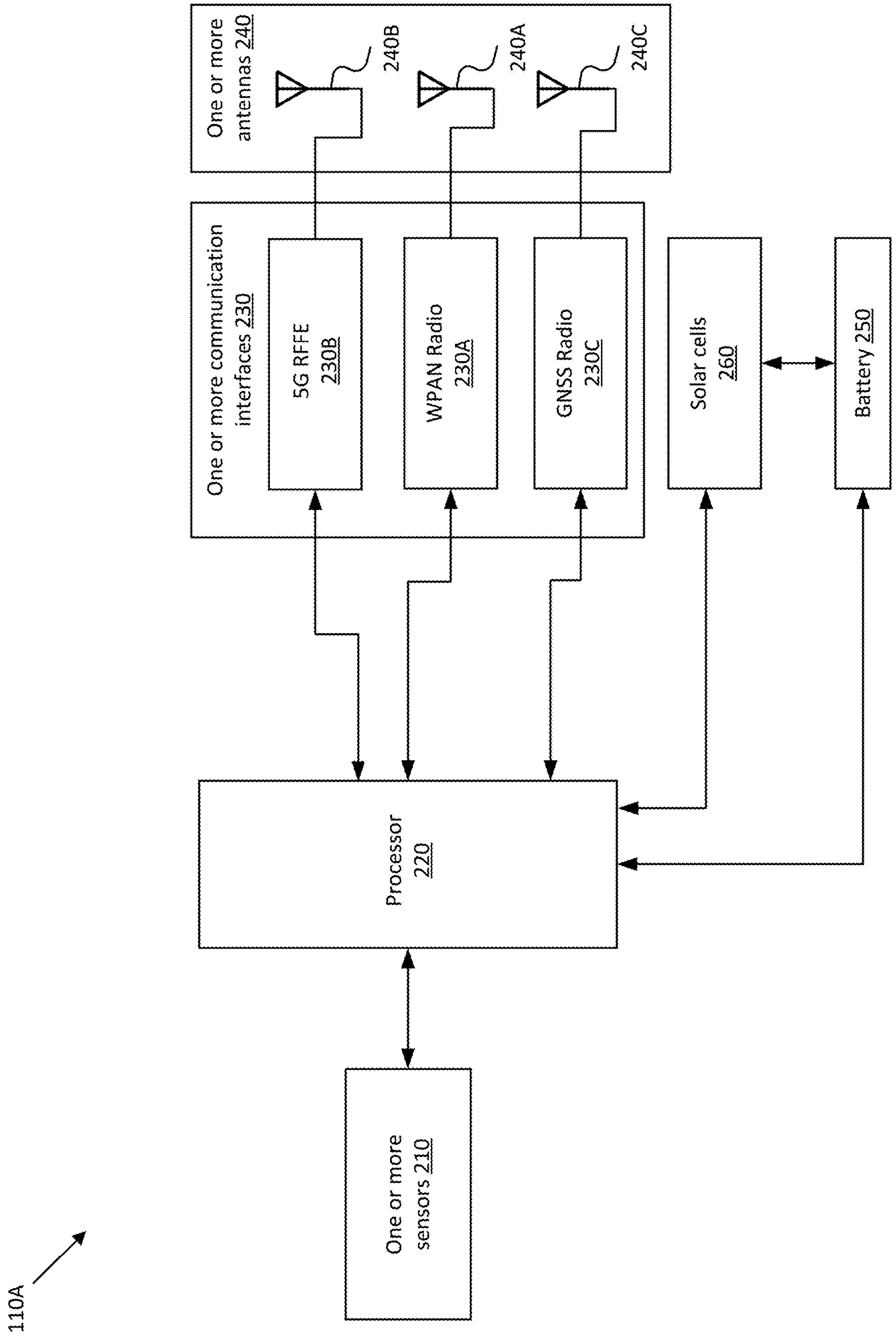
FIG. 2A is a block diagram of an exemplary sensor device in which aspects of the technology may be employed.

As shown in FIG. 2A, each of the sensor devices 110, for example, a first sensor device 110A, may include one or more sensors 210, a processor 220, one or more communication interfaces 230, and one or more antennas 240. The one or more sensors 210 are configured to measure a physical parameter. The processor 220 is configured to detect a condition indicative of a forest fire based on the measured physical parameter, and generate a signal when the condition indicative of the forest fire is detected. The one or more communication interfaces 230 are coupled to one or more antennas 240. As will be described below, the communication interfaces 230 in conjunction with the antennas 240 are configured to communicate the signal when the condition indicative of the forest fire is detected. The signal is modulated with data indicating that the condition indicative of the forest fire has been detected. Each of the sensor devices 110 is configured to establish communication with at least one of the satellites 120 to transmit the signal.

The sensor devices 110 may include one or more antennas 240A configured to facilitate communication with other ones of sensor devices 110, and one or more antennas 240B configured to facilitate communication with the satellites 120. In one embodiment, the one or more antennas 240A are coupled with a wireless personal area network (WPAN) radio 230A (i.e., a first communication interface of the one or more communication interfaces 230) that is configured to facilitate wireless connectivity with the other ones of the sensor devices 110 by way of the one or more antennas 240A. In one example, the WPAN radio 230A is a Bluetooth Low Energy (BLE) Radio configured to communicate with the other ones of the sensor devices 110 via Bluetooth. The one or more antennas 240B are coupled with a 5th Generation (5G) radio frequency front end (RFFE) radio 230B (i.e., a second communication interface of the one or more communication interfaces 230) that is configured to facilitate wireless connectivity between the sensor devices 110 and the satellites 120 by way of the one or more antennas 240B.

The sensor devices 110 may further include one or more antennas 240C configured to facilitate communication with global navigation satellite system (GNSS). In one embodiment, the one or more antennas 240C are coupled with a GNSS radio 230C (i.e., a third communication interface of the one or more communication interfaces 230) that is configured to provide wireless connectivity with the GNSS the sensor devices 110 by way of the one or more antennas 240A. The GNSS radio 230C is configured to receive the signals from the satellites of the GNSS 130 via the one or more antennas 240C to determine the location of the sensor devices 110.

Figure 2B:
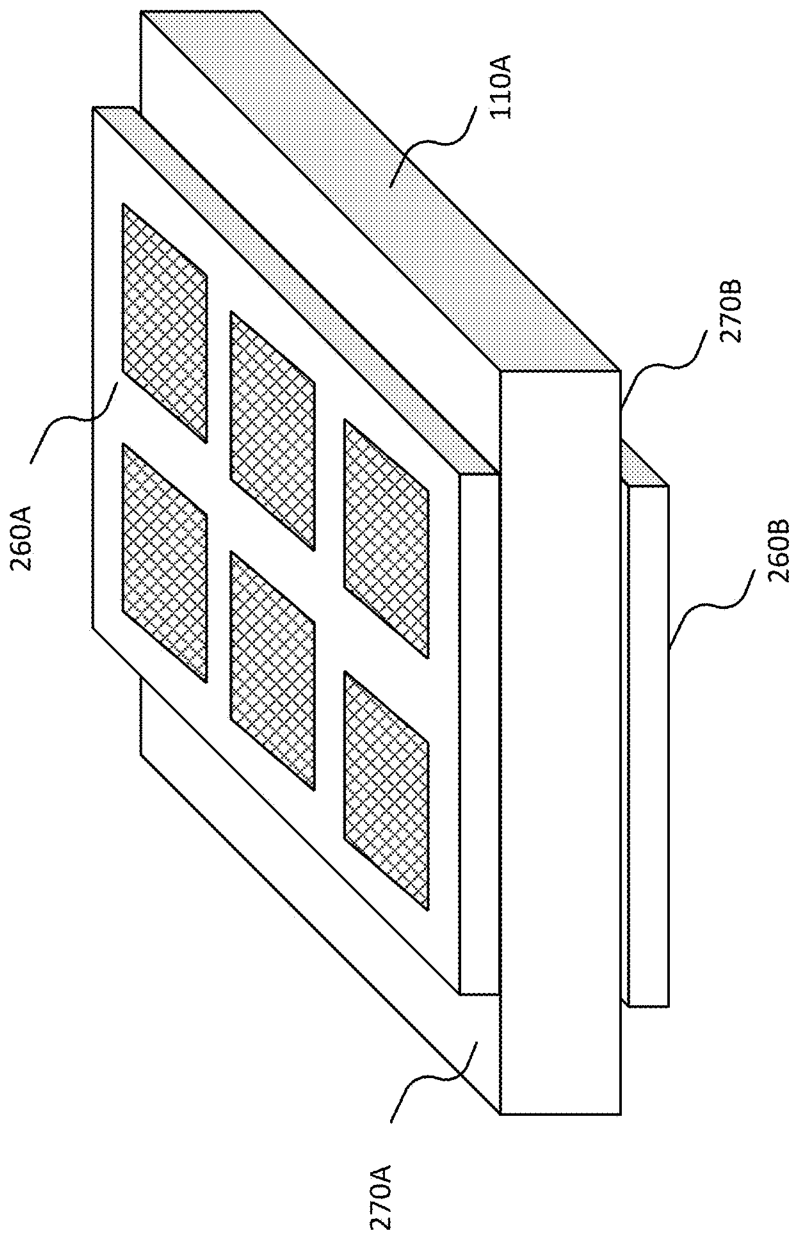
FIG. 2B is a side view of an exemplary sensor device in which aspects of the technology may be employed.

The sensor devices 110 may include at least one battery 250, and solar cells 260 configured to receive light and charge the at least one battery 250. For example, as shown in FIG. 2B, the solar cells 260 may include: a first set of solar cells 260-A disposed on a first side 270-A of the sensor device 110, and a second set of solar cells 260-B disposed on a second side 270-B of the sensor device 110. This way, based on an orientation of the sensor device 110, at least one of the first set of solar cells 280-A and the second set of solar cells 280-B may be exposed to incoming solar radiation and thus disposed in a manner to charge the battery 250.

In some embodiments of the present disclosure, each of the sensor devices 110 may include multiple sensors 210 (or a "set" or "plurality" of sensors) that measure a physical parameter or variable that can be used to detect a fire. Various types sensors 210 can be used detect the presence of fire-related parameters such as gases, heat, smoke, and even visual cues.

Depending on the implementation, the physical parameter (s) measured by each sensor of the set of sensors can include one or more of: a carbon dioxide ($CO_2$) level, another gas level associated with combustion, a smoke particle level, a temperature level, an emission level, and a radiation level, etc. For example, depending on the implementation, each of the sensor devices 110 includes may include one or more of: a carbon dioxide ($CO_2$) sensor, a thermal imaging sensor, a smoke detector, a gas sensor, a flame detector, an ultraviolet sensor, an acoustic sensor, a thermocouple, a fiber optic temperature sensor, a flame ionization detector, etc.

Types of Sensors

Smoke Detection Sensors: Smoke detection sensors, such as optical and ionization smoke detectors, are used to detect the presence of smoke particles in the air. Optical detectors use light beams that are scattered by smoke particles. Ionization detectors work by detecting the electrical current changes caused by smoke particles entering an ionization chamber.

Heat Detection Sensors: Heat detection sensors, such as thermocouples and temperature-sensitive elements, monitor temperature changes in the environment. A rapid rise in temperature can indicate the presence of a fire.

Gas Detection Sensors: Gas detection sensors are designed to detect the presence of combustion-related gases, such as carbon monoxide (CO) and carbon dioxide (CO2). Changes in gas concentrations are indicative of combustion processes and can provide early warnings of fire.

Flame Detection Sensors: Flame detectors use optical sensors to detect the specific wavelengths of light emitted by flames. These detectors are sensitive to the unique spectral characteristics of flames and can identify open flames even in obscured conditions.

Thermal Imaging Sensors: Thermal imaging sensors capture infrared radiation emitted by objects based on their temperature. In the presence of a fire, these sensors can identify areas with elevated temperatures and detect hotspots.

Acoustic Sensors: Acoustic sensors listen for sounds characteristic of combustion, such as crackling flames or explosions. These sensors can detect fire-related noises and activate alarms.

Visible light or infrared sensors: Visible light or infrared sensors can be used to visually monitor areas for the presence of flames, smoke, or changes in thermal patterns. Advanced image analysis techniques can be used to identify fire-related patterns.

Gas Chromatographs: Gas chromatographs analyze gas samples for their composition. They can identify and quantify the presence of specific gases associated with fire.

Wireless Sensor Networks: Networks of interconnected sensors can be deployed across an area to monitor temperature, humidity, smoke, and other environmental parameters. Data from multiple sensors are collected and analyzed to detect fire events.

Machine Learning and Data Fusion: Sensor data can be combined using machine learning and data fusion techniques to improve the accuracy of fire detection. Integration of data from several types of multiple sensors that provide complementary information about a fire's characteristics can be particularly effective. These techniques can help distinguish between false alarms and actual fire events.

Satellites

Antenna arrays, including phased array antenna systems, can dynamically adjust their radiation patterns to focus energy in the desired direction, enhancing the chances of non-line-of-sight (NLOS) communication. Phased array antenna systems are known for their adaptability, as they can dynamically adjust their beam patterns without mechanical movement. This flexibility is especially valuable for satellites in NTN configurations, which require efficient communication with multiple ground-based stations and user equipment as the satellite orbits the Earth. Additionally, lower-frequency signals tend to diffract and penetrate obstacles more effectively than higher-frequency signals. Further, when the wavelength of the signal is comparable to the size of the obstacle signals can bend or diffract around obstacles.

As shown in FIG. 1, each of the satellites 120 may include a phased array antenna system 150. For example, in one embodiment, each phased array antenna system 150 may be implemented as a gNodeB that is one part of a 5G Non-Terrestrial Network (NTN) satellite. Each phased array antenna system 150 may dynamically steer beams and provide coverage to different locations as the satellite 120 moves across the sky. Stated differently, each phased array antenna system 150 can dynamically steer and shape the radiation pattern of the antenna, making it an important component for establishing efficient and reliable communication links between satellites 120 and ground-based stations and user devices, such as sensor devices 110.

Each phased array antenna system 150 may be capable of both transmitting and receiving signals, and may be designed to provide directional control over the transmitted and received electromagnetic signals. For example, when transmitting, each phased array antenna system 150 may be configured to generate a beam of radio waves. In this context, a beam refers to a focused or directed signal that is transmitted from the satellite's antenna to a specific area on the Earth's surface. The satellite's antenna system is designed to concentrate the signal's energy into a narrow region, effectively creating a "beam" of communication that covers a targeted geographic area. In other words, a beam may refer to the directed path of radio waves that target specific areas on the Earth's surface to provide communication services, where a radio wave can refer to a specific type of electromagnetic wave that carries a communication signal with a particular frequency and wavelength. The radio wave includes both the carrier frequency and the modulated information, such as voice, data, or video.

Each phased array antenna system 150 adjusts the phase and amplitude of individual antenna elements to create a focused and directed beam of electromagnetic waves. By carefully controlling the phase relationships of the signals emitted from each element, the antenna can steer the beam's direction without physically moving the entire antenna structure. This directed beam allows the satellite to target specific areas on the Earth's surface for communication.

By contrast, when the phased array antenna system 150 is in receiving mode, it utilizes the same principles of phase and amplitude control to selectively receive signals from a particular direction. The received signals are then combined coherently to enhance the sensitivity of the antenna in that specific direction. This directional receiving capability is useful for efficiently capturing signals from the desired sources while minimizing interference from other directions.

The system 100 can use lower frequencies and longer wavelengths to improve NLOS performance. In one non-limiting example, to help achieve NLOS communication capability on the downlink, each phased array antenna system 130 may be configured to generate a satellite beam of radio waves at, for example, a frequency less than or equal to 300 Mega Hertz (MHz), and at a wavelength greater than or equal to 1 meter such that the satellite beam of radio waves has a power flux density of at least −100 Decibels Milliwatt per Square Meter ($dBm/m^2$).

Each phased array antenna system 150 may be configured to receive, from at least one of the sensor devices 110, the signal modulated with data indicating that the condition indicative of the forest fire has been detected.

In an exemplary embodiment of the present disclosure, each antenna 230B of each of the sensor devices 110 is configured to communicate directly with at least one phased array antenna system 150 of at least one of the plurality of satellites 120.

In an exemplary embodiment of the present disclosure, as illustrated in FIG. 1, the sensor devices 110 are configured to communicate with each other and exchange data when in range of each other. This allows for the sensor devices 110 to be configured as a mesh network so that the sensor devices 110 can communicate information with each other.

The capability to exchange information between sensor devices 110 can be useful for a number of reasons. For example, in a scenario where a sensor device detects the forest fire, but is unable to connect with a satellite and send an alert due to damage by forest fire does not necessarily render it useless. In this case, a signal or alert from the unconnected sensor device 110 can be sent to another sensor device 110 that has the ability to establish a communication link with a satellite. For example, in an exemplary embodiment of the system 100, the sensor devices 110 may include: a sensor device 110-A and a sensor device 110-B that is in communication with the sensor device 110-A and aware of its status. The sensor device 110-A may be configured to generate a first signal when a condition indicative of the forest fire is detected and communicate the first signal so that it may be received by at least one of the plurality of satellites. However, when the first signal communicated by first forest sensor is not acknowledged by at least one of the plurality of satellites, the sensor device 110-B may be configured to retransmit a second signal that is modulated with data indicating that the condition indicative of the forest fire has been detected by the sensor device 110-A.

Figure 3:
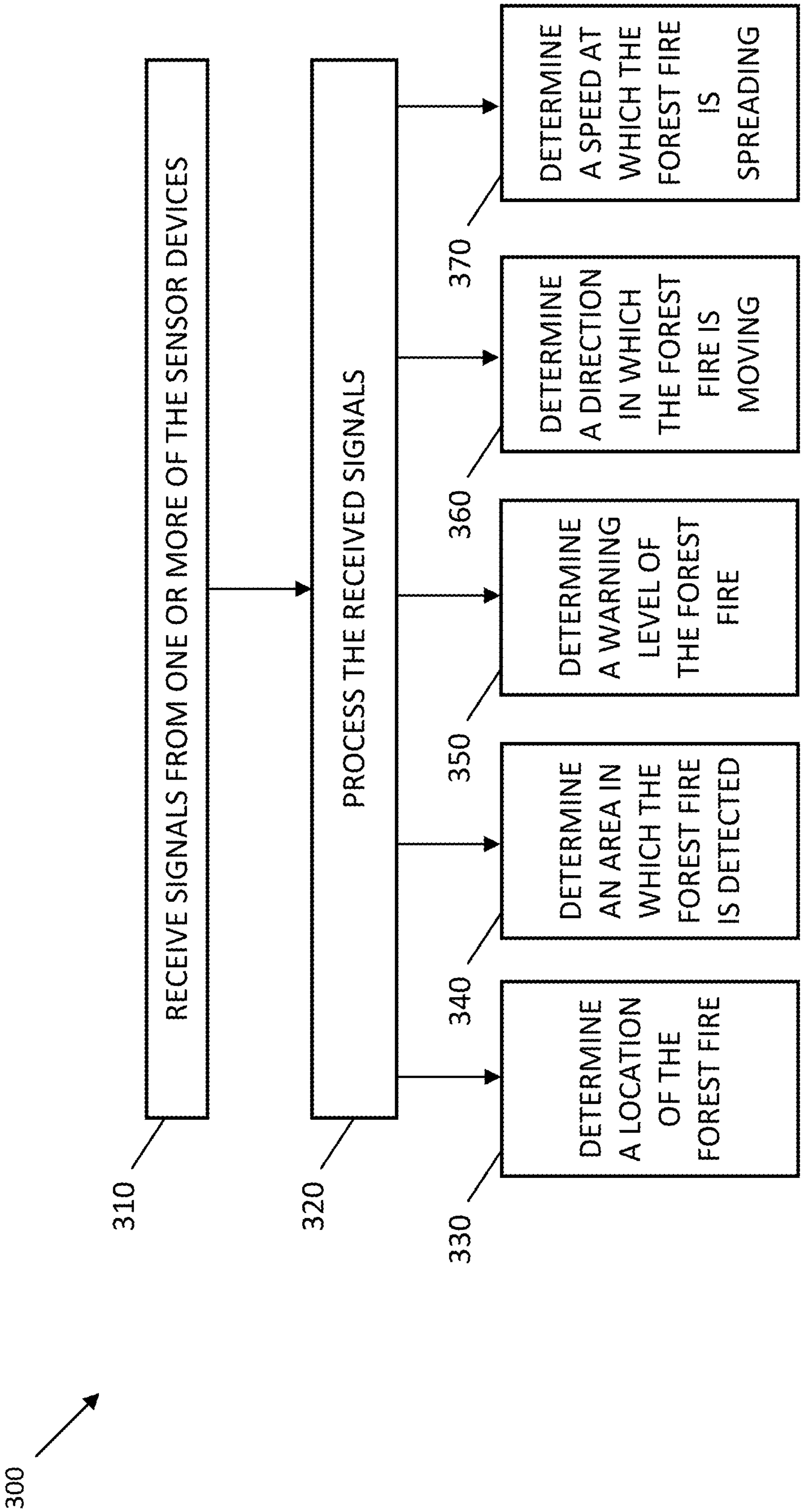
FIG. 3 is a flowchart illustrating one example of a method for processing information received from sensor devices according to aspects of the disclosed technology.

FIG. 3 is a flowchart illustrating one example of a method 300 for processing information received from sensor devices 110 according to aspects of the disclosed technology. As shown in FIG. 3, each of the satellites 120 may receive signals (at 310) from one or more of the sensor devices 110, and may process the received signals (at 320) to determine various information such as: a location of the forest fire (at 330), an area in which the forest fire is detected (at 340), a warning level of the forest fire (at 350), a direction in which the forest fire is moving (at 360), a speed at which the forest fire is spreading (at 370), etc.

For example, based on locations of the sensor devices 110 which detected the condition indicative of the forest fire, at 330, each of the satellites 120 may determine the location of the forest fire. Likewise, based on locations of the sensor devices 110 which detected the condition indicative of the forest fire, at 340, each of the satellites 120 may determine the area in which the forest fire is detected.

At 350, based on the number of the sensor devices 110 that detected the condition indicative of the forest fire, each of the satellites 120 may determine a warning level of the forest fire. The warning level of the forest fire may be proportional to the number of the sensor devices 110 that detected the condition indicative of the forest fire. For example, the warning level can be greater when a larger number of sensor devices 110 have detected the condition indicative of the forest fire and can be lower when a smaller number of sensor devices 110 have detected the condition indicative of the forest fire.

At 360, each of the satellites 120 may determine a direction in which the forest fire is moving based on one or more of: locations of the sensor devices 110 that detected the condition indicative of the forest fire, and timestamps at which the signal(s) is/are received from the sensor devices 110 that detected the condition indicative of the forest fire.

At 370, each of the satellites 120 may determine a speed at which the forest fire is spreading based on one or more of: locations of the sensor devices 110 that detected the condition indicative of the forest fire, and timestamps at which the signal(s) is/are received from the sensor devices 110 that detected the condition indicative of the forest fire.

Figure 4:
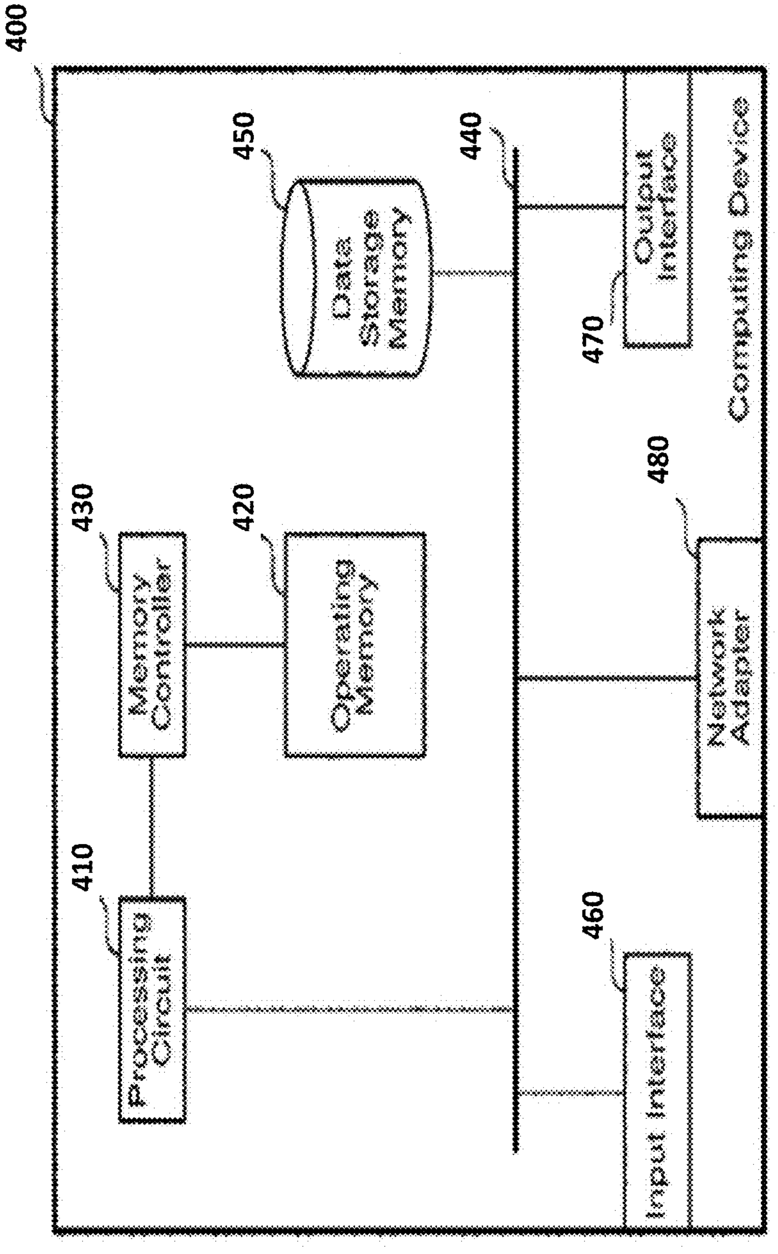
FIG. 4 is a diagram illustrating one example of computing device in which aspects of the technology may be practiced.

FIG. 4 is a diagram illustrating one example of computing device 400 in which aspects of the technology may be practiced. Computing device 400 may be virtually any type of general-purpose or specific-purpose computing device. For example, computing device 400 may be an example of the processor 220, a computing system or device associated with either entity 110, 120 as described above with reference to FIGS. 1-3.

As illustrated in FIG. 4, computing device 400 includes processing circuit 410, operating memory 420, memory controller 430, data storage memory 450, input interface 460, output interface 470, and network adapter 480. Each of these afore-listed components of computing device 400 includes at least one hardware element.

Computing device 400 includes at least one processing circuit 410 configured to execute instructions, such as instructions for implementing the herein-described workloads, processes, or technology. Processing circuit 410 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 420 during run-time of computing device 400. Operating memory 420 may also include any of a variety of data storage devices/components, such as volatile memories, semi-volatile memories, random access memories, static memories, caches, buffers, or other media used to store run-time information. In one example, operating memory 420 does not retain information when computing device 400 is powered off. Rather, computing device 400 may be configured to transfer instructions from a non-volatile data storage component (e.g., data storage component 450) to operating memory 420 as part of a booting or other loading process. In some examples, other forms of execution may be employed, such as execution directly from data storage component 450.

Operating memory 420 may include 4th generation double data rate (DDR4) memory, 3rd generation double data rate (DDR3) memory, other dynamic random access memory (DRAM), High Bandwidth Memory (HBM), Hybrid Memory Cube memory, 3D-staked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 410 via memory controller 430 in channels. One example of computing device 400 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 420 specifically does not include or encompass communications media, any communications medium, or any signals per se.

Memory controller 430 is configured to interface processing circuit 410 to operating memory 420. For example, memory controller 430 may be configured to interface commands, addresses, and data between operating memory 420 and processing circuit 410. Memory controller 430 may also be configured to abstract or otherwise manage certain aspects of memory management from or for processing circuit 410. Although memory controller 430 is illustrated as single memory controller separate from processing circuit 410, in other examples, multiple memory controllers may be employed, memory controller(s) may be integrated with operating memory 420, or the like. Further, memory controller(s) may be integrated into processing circuit 410. These and other variations are possible.

In computing device 400, data storage memory 450, input interface 460, output interface 470, and network adapter 480 are interfaced to processing circuit 410 by bus 440. Although, FIG. 4 illustrates bus 440 as a single passive bus, other configurations, such as a collection of buses, a collection of point-to-point links, an input/output controller, a bridge, other interface circuitry, or any collection thereof may also be suitably employed for interfacing data storage memory 450, input interface 460, output interface 470, or network adapter 480 to processing circuit 410.

In computing device 400, data storage memory 450 is employed for long-term non-volatile data storage. Data storage memory 450 may include any of a variety of non-volatile data storage devices/components, such as non-volatile memories, disks, disk drives, hard drives, solid-state drives, or any other media that can be used for the non-volatile storage of information. However, data storage memory 450 specifically does not include or encompass communications media, any communications medium, or any signals per se. In contrast to operating memory 420, data storage memory 450 is employed by computing device 400 for non-volatile long-term data storage, instead of for run-time data storage.

Also, computing device 400 may include or be coupled to any type of processor-readable media such as processor-readable storage media (e.g., operating memory 420 and data storage memory 450) and communication media (e.g., communication signals and radio waves). While the term processor-readable storage media includes operating memory 420 and data storage memory 450, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 400 also includes input interface 460, which may be configured to enable computing device 400 to receive input from users or from other devices. In addition, computing device 400 includes output interface 470, which may be configured to provide output from computing device 400.

In the illustrated example, computing device 400 is configured to communicate with other computing devices or entities via network adapter 480. Network adapter 480 may include a wired network adapter, e.g., an Ethernet adapter, a Token Ring adapter, or a Digital Subscriber Line (DSL) adapter. Network adapter 480 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 400 is illustrated with certain components configured in a particular arrangement, these components and arrangement are merely one example of a computing device in which the technology may be employed. In other examples, data storage memory 450, input interface 460, output interface 470, or network adapter 480 may be directly coupled to processing circuit 410, or be coupled to processing circuit 410 via an input/output controller, a bridge, or other interface circuitry. Other variations of the technology are possible.

Some examples of computing device 400 include at least one memory (e.g., operating memory 420) adapted to store run-time data and at least one processor (e.g., processing unit 410) that is adapted to execute processor-executable code that, in response to execution, enables computing device 400 to perform actions, where the actions may include, in some examples, actions for one or more methodologies or processes described herein, such as, method 300 of FIG. 3, as described above.

The device or system of the present disclosure may additionally include one or more sensor to sense or gather data pertaining to the surrounding environment or operation of the device or system. Some exemplary sensors capable of being electronically coupled with the device or system of the present disclosure (either directly connected to the device or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The device or system of the present disclosure may include wireless communication logic coupled to sensors on the device or system. The sensors gather data and provide the data to the wireless communication logic. Then, the wireless communication logic may transmit the data gathered from the sensors to a remote device. Thus, the wireless communication logic may be part of a broader communication system, in which one or several devices or systems of the present disclosure may be networked together to report alerts and, more generally, to be accessed and controlled remotely. Depending on the types of transceivers installed in the device or system of the present disclosure, the system may use a variety of protocols (e.g., Wifi, ZigBee, MiWi, Bluetooth) for communication. In one example, each of the devices or systems of the present disclosure may have its own IP address and may communicate directly with a router or gateway. This would typically be the case if the communication protocol is WiFi.

In another example, a point-to-point communication protocol like MiWi or ZigBee is used. One or more of the device or system of the present disclosure may serve as a repeater, or the devices or systems of the present disclosure may be connected together in a mesh network to relay signals from one device or system to the next. However, the individual device or system in this scheme typically would not have IP addresses of their own. Instead, one or more of the devices or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system also allows individuals to access the device or system of the present disclosure for configuration and diagnostic purposes. In that case, the individual processors or microcontrollers of the device or system of the present disclosure may be configured to act as Web servers that use a protocol like hypertext transfer protocol (HTTP) to provide an online interface that can be used to configure the device or system. In some embodiments, the systems may be used to configure several devices or systems of the present disclosure at once. For example, if several devices or systems are of the same model and are in similar locations in the same location, it may not be necessary to configure the devices or systems individually. Instead, an individual may provide configuration information, including baseline operational parameters, for several devices or systems at once.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software-controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments,"

"one particular embodiment," "an example embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an example embodiment," "an exemplary embodiment," or "other embodiments," or the like, are not necessarily all referring to the same embodiments. References in the specification to "an embodiment," "one embodiment," "some embodiments," "one particular embodiment," "an example embodiment," "an exemplary embodiment," or "other embodiments," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

The description and illustration of various embodiments of the disclosure are examples and the disclosure is not limited to the exact details shown or described. While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed:

1. A system for detecting forest fires, the system comprising:

a plurality of sensor devices in communication with each other, wherein the plurality of sensor devices are deployed at different locations in a geographic area that includes a forest, wherein each of the plurality of sensor devices comprises:

at least one sensor configured to: measure a physical parameter;

a processor configured to: detect a condition indicative of a forest fire based on the measured physical parameter, and generate a signal when the condition indicative of the forest fire is detected, wherein the signal is modulated with data indicating that the condition indicative of the forest fire has been detected; and at least one communication interface and antenna configured to communicate the signal; and a plurality of satellites in communication with at least one of the plurality of sensor devices via non-line-of-sight communication, wherein each of the plurality of satellites comprises:

a phased array antenna system that is configured to receive, from at least one of the sensor devices, the signal that is modulated with data indicating that the condition indicative of the forest fire has been detected, wherein each phased array antenna system is configured to generate a satellite beam of radio waves at a frequency less than or equal to 300 Mega Hertz (MHz) and at a wavelength greater than or equal to 1 meter to enable non-line-of-sight communication.

2. The system of claim 1, wherein each of the plurality of sensor devices includes:

one or more antennas configured to facilitate communication with other ones of plurality of sensor devices and the plurality of satellites;

at least one battery; and solar cells configured to receive light and charge the at least one battery.

3. The system of claim 2, wherein the solar cells include:

a first set of solar cells disposed on a first side of the sensor device; and a second set of solar cells disposed on a second side of the sensor device, wherein at least one of the first set of solar cells and the second set of solar cells is configured to charge the at least one battery based on an orientation of the sensor device.

4. The system of claim 1, wherein the plurality of sensor devices are positioned at the different locations in the geographic area to provide sensor coverage over substantially all of the forest.

5. The system of claim 1, wherein each antenna of each of the plurality of sensor devices is configured to communicate directly with at least one phased array antenna system of at least one of the plurality of satellites.

6. The system of claim 1, wherein each sensor device further comprises:

a set of sensors including the at least one sensor.

7. The system of claim 6, wherein each sensor of the set of sensors is at least one of:

a carbon dioxide ($CO_2$) sensor, a thermal imaging sensor, a smoke detector, a gas sensor, a flame detector, an ultraviolet sensor, an acoustic sensor, a thermocouple, a fiber optic temperature sensor, and a flame ionization detector.

8. The system of claim 6, wherein the physical parameter measured by each sensor of the set of sensors is at least one of:

a carbon dioxide ($CO_2$) level, another gas level associated with combustions, a smoke particle level, a temperature level, an emission level, and a radiation level fire.

9. The system of claim 1, wherein the plurality of satellites are configured to determine, based on the signal received from at least one of the plurality of sensor devices, at least one of: a location of the forest fire, an area in which the forest fire is detected, a warning level of the forest fire, a direction in which the forest fire is moving, and a speed at which the forest fire is spreading.

10. The system of claim 9, wherein at least one of: the location of the forest fire and the area in which the forest fire is detected is determined based on locations of the sensor devices which detected the condition indicative of the forest fire.

11. The system of claim 9, wherein the warning level of the forest fire is determined based on a number of the sensor devices that detected the condition indicative of the forest fire.

12. The system of claim 11, wherein the warning level of the forest fire is proportional to the number of the sensor devices that detected the condition indicative of the forest fire such that the warning level is greater when a larger number of sensor devices have detected the condition indicative of the forest fire and is lower when a smaller number of sensor devices have detected the condition indicative of the forest fire.

13. The system of claim 1, wherein at least one of a direction in which the forest fire is moving and a speed at which the forest fire is spreading are determined based on:

locations of the sensor devices that detected the condition indicative of the forest fire; and timestamps at which the signal is received from the sensor devices that detected the condition indicative of the forest fire.

14. The system of claim 1, wherein the plurality of sensor devices are configured to communicate with each other and exchange data to configure a mesh network such that the plurality of sensor devices are configured to communicate information with each other.

15. The system of claim 14, wherein the plurality of sensor devices comprise:

a first sensor device that is configured to generate a first signal when the condition indicative of the forest fire is detected and communicate the first signal when the condition indicative of the forest fire is detected; and a second sensor device that is configured to retransmit directly to at least one of the plurality of satellites via non-line-of-sight communication, when the first signal communicated by first forest sensor is not acknowledged by at least one of the plurality of satellites, a second signal that is modulated with data indicating that the condition indicative of the forest fire has been detected by the first sensor device.

16. A sensor device for detecting forest fires, the sensor device comprising:

at least one sensor configured to measure a physical parameter;

a processor configured to: detect a condition indicative of a forest fire based on the measured physical parameter, and generate a signal for communication to a satellite when the condition indicative of the forest fire is detected; and a first communication interface and at least one antenna configured to directly communicate with the satellite via non-line-of-sight communication, and operable to transmit the signal to the satellite, wherein the signal is modulated with data indicating that the condition indicative of the forest fire has been detected, wherein the satellite comprises a phased array antenna system configured to generate a satellite beam of radio waves at a frequency less than or equal to 300 Mega Hertz (MHz) and at a wavelength greater than or equal to 1 meter to enable non-line-of-sight communication via the first communication interface.

17. The sensor device of claim 16, further comprising:

one or more antennas configured to facilitate communication with other ones of plurality of sensor devices and the plurality of satellites;

at least one battery; and solar cells configured to receive light and charge the at least one battery.

18. The sensor device of claim 17, wherein the solar cells include:

a first set of solar cells disposed on a first side of the sensor device; and a second set of solar cells disposed on a second side of the sensor device, wherein at least one of the first set of solar cells and the second set of solar cells is configured to charge the at least one battery based on an orientation of the sensor device.

19. The sensor device of claim 16, wherein the one or more antennas are configured to communicate directly with at least one phased array antenna system of the satellite.

20. The sensor device of claim 16, further comprising:

a set of sensors including the at least one sensor, wherein each sensor of the set of sensors is at least one of:

a carbon dioxide ($CO_2$) sensor, a thermal imaging sensor,
a smoke detector,
a gas sensor,
a flame detector,
an ultraviolet sensor,
an acoustic sensor,
a thermocouple,
a fiber optic temperature sensor, and
a flame ionization detector, and wherein the physical parameter measured by each sensor of the set of sensors is at least one of:

a carbon dioxide ($CO_2$) level,
another gas level associated with combustions,
a smoke particle level,
a temperature level,
an emission level, and
a radiation level fire.

21. A satellite that is configured to communicate with at least one of a plurality of terrestrial sensor devices via non-line-of-sight communication, the satellite comprising:

a communication interface; and a phased array antenna system that is coupled to the communication interface, the phased array antenna system being configured to:

receive a signal transmitted directly from at least one terrestrial sensor device, wherein the signal is modulated with data indicating that a condition indicative of the forest fire has been detected, and wherein the phased array antenna system is configured to generate a satellite beam of radio waves at a frequency less than or equal to 300 Mega Hertz (MHz) and at a wavelength greater than or equal to 1 meter to enable non-line-of-sight communication.

22. The satellite of claim 21, wherein the satellite further comprises:

a processor configured to determine, based on the signal received from the at least one of the plurality of terrestrial sensor devices, at least one of: a location of the forest fire, an area in which the forest fire is detected, a warning level of the forest fire, a direction in which the forest fire is moving, and a speed at which the forest fire is spreading.

23. The satellite of claim 22, wherein the location of the forest fire is determined based on locations of the terrestrial sensor devices which detected the condition indicative of the forest fire, wherein the area in which the forest fire is detected is determined based on locations of the terrestrial sensor devices which detected the condition indicative of the forest fire, wherein the warning level of the forest fire is determined based on a number of the terrestrial sensor devices that detected the condition indicative of the forest fire.

24. A method for detecting forest fires, the method comprising:

receiving, at a satellite comprising a phased array antenna system configured to communicate via non-line-of-sight communication at a frequency less than or equal to 300 Mega Hertz (MHz) and at a wavelength greater than or equal to 1 meter, signals from one or more terrestrial sensor devices; and processing the received signals to determine at least one of:

a location of the forest fire,
an area in which the forest fire is detected,
a warning level of the forest fire,
a direction in which the forest fire is moving, and
a speed at which the forest fire is spreading.

* * * * *